US012475899B2

(12) United States Patent
Zhu

(10) Patent No.: US 12,475,899 B2
(45) Date of Patent: Nov. 18, 2025

(54) AUDIO DATA TRANSMISSION METHOD AND RELATED APPARATUS

(71) Applicant: HUAWEI TECHNOLOGIES CO., LTD., Guangdong (CN)

(72) Inventor: Jiezuo Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 17/989,395

(22) Filed: Nov. 17, 2022

(65) Prior Publication Data

US 2023/0072286 A1 Mar. 9, 2023

Related U.S. Application Data

(63) Continuation of application No. PCT/CN2020/091647, filed on May 21, 2020.

(51) Int. Cl.
*G10L 11/00* (2006.01)
*G10L 19/008* (2013.01)

(52) U.S. Cl.
CPC .................................. *G10L 19/008* (2013.01)

(58) Field of Classification Search
CPC ............................ G10L 19/008; G10L 19/167
USPC .......................................................... 704/500
See application file for complete search history.

(56) References Cited

U.S. PATENT DOCUMENTS 8,050,203 B2 11/2011 Jacobsen et al.
9,820,073 B1 11/2017 Foti
2003/0014136 A1 1/2003 Wang et al.
2010/0239096 A1 9/2010 Jeon et al.
2014/0278446 A1* 9/2014 Kamano .............. G10L 19/008 704/500
2018/0091926 A1 3/2018 Cho et al.
2018/0190300 A1 7/2018 Mate et al.

FOREIGN PATENT DOCUMENTS

AU 2008314029 A1 4/2009
CN 1149795 A 5/1997
CN 101027717 A 8/2007
CN 101053017 A 10/2007
(Continued)

OTHER PUBLICATIONS

ITU-T H.230, "Series H: Audiovisual and Multimedia Systems Infrastructure of audiovisual services Systems aspects; Frame-synchronous control and indication signals for audiovisual systems," May 2019, 34 pages.
(Continued)

*Primary Examiner* — Md S Elahee
(74) *Attorney, Agent, or Firm* — Fish & Richardson P.C.

(57) ABSTRACT

The present disclosure relates to audio data transmission methods and apparatuses. In one example method, a sending apparatus obtains first formatted bitstream data corresponding to a common component of at least one channel of audio data, and obtains at least one channel of second formatted bitstream data corresponding to the at least one channel of audio data. The at least one channel of second formatted bitstream data is obtained based on the at least one channel of audio data and the common component. The sending apparatus sends the first formatted bitstream data and the at least one channel of second formatted bitstream data.

20 Claims, 6 Drawing Sheets

(56) References Cited

FOREIGN PATENT DOCUMENTS

| | | | | |
|---|---|---|---|---|
| CN | 101151659 | A | | 3/2008 |
| CN | 101433099 | A | | 5/2009 |
| CN | 101448152 | A | | 6/2009 |
| CN | 101635145 | A | | 1/2010 |
| CN | 101924914 | A | | 12/2010 |
| CN | 101944362 | A | | 1/2011 |
| CN | 102138177 | A | | 7/2011 |
| CN | 102301730 | A | | 12/2011 |
| CN | 103428483 | A | | 12/2013 |
| CN | 105071897 | A | | 11/2015 |
| CN | 110138513 | A | | 8/2019 |
| EP | 2786594 | A1 | | 10/2014 |
| KR | 2006094551 | A | * | 8/2006 |
| WO | 2012020828 | A1 | | 2/2012 |
| WO | 2013079993 | A1 | | 6/2013 |

OTHER PUBLICATIONS

Shu et al., "Normalization of LPC Residue for Random Access Frame in Audio Coding," 2011 IEEE Workshop on Applications of Signal Processing to Audio and Acoustics, New Paltz, NY, Oct. 16-19, 2011, 4 pages.

Zhang, "Design and Implementation of a Multi-channel Stereo Audio Encoding System," Thesis for Master degree, Tianjin University, Dec. 2012, 65 pages (with an English abstract).

Extended European Search Report in European Appln No. 20937031.1, dated Jun. 6, 2023, 10 pages.

International Search Report and Written Opinion in International Appln. No. PCT/CN2020/091647, mailed on Feb. 20, 2021, 17 pages (with English translation).

* cited by examiner

AUDIO DATA TRANSMISSION METHOD AND RELATED APPARATUS

CROSS-REFERENCE TO RELATED APPLICATIONS

This application is a continuation of International Application No. PCT/CN2020/091647, filed on May 21, 2020, the disclosure of which is hereby incorporated by reference in its entirety.

TECHNICAL FIELD

This application relates to the field of communication technologies, and in particular, to an audio data transmission method and a related apparatus. This application may be further applied to cockpit domain communication, for example, the field of intelligent driving, unmanned driving, or the Internet of Vehicles.

BACKGROUND

Usually, to obtain a better sound effect, most audio sending apparatuses are multiplex. For example, after obtaining a plurality of channels of audio data simultaneously collected by a plurality of microphones, and then centrally processing the plurality of channels of obtained audio data, a sending apparatus sends the plurality of channels of obtained audio data to a plurality of receiving apparatuses.

Currently, audio data is transmitted between a sending apparatus and a plurality of receiving apparatuses through a wired cable, which is not conducive to movement between the sending apparatus and the plurality of receiving apparatuses. In addition, cable deployment not only increases extra costs, but also is relatively difficult to achieve in some cases. To resolve problems of inconvenience and costs caused by wired transmission of audio data, in the conventional technology, the audio data is usually transmitted between the sending apparatus and the plurality of receiving apparatuses in a wireless manner (for example, Wi-Fi or Bluetooth). Specifically, the sending apparatus correspondingly processes the plurality of channels of collected audio data to convert the plurality of channels of collected audio data into wireless data, and then sends the wireless data to the plurality of receiving apparatuses. Then, each of the plurality of receiving apparatuses correspondingly processes the received wireless data and splits it into a plurality of channels of audio data, and then obtains, from the plurality of channels of audio data, one channel of audio data required by the receiving apparatus. For example, the sending apparatus performs corresponding de-redundancy processing on the plurality of channels of audio data to form unified formatted bitstream data.

However, if only one channel of audio data is needed, a single receiving apparatus needs to process complete formatted bitstream data and split it into a plurality of channels of audio data, and then obtains, from the plurality of channels of audio data, one channel of audio data required by the receiving apparatus. Audio data that is not required can only be discarded. This causes problems of wasting radio transmission resources used for transmitting a plurality of channels of audio data and increasing power consumption of the receiving apparatus.

SUMMARY

Embodiments of this application provide an audio data transmission method and a related apparatus, to save wireless transmission resources used for transmitting a plurality of channels of audio data and reduce power consumption of a receiving apparatus.

According to a first aspect, an embodiment of this application provides an audio data transmission method. The method includes: obtaining first formatted bitstream data corresponding to a common component of at least one channel of audio data; obtaining at least one channel of second formatted bitstream data corresponding to the at least one channel of audio data; and sending the first formatted bitstream data and the at least one channel of second formatted bitstream data. The at least one channel of second formatted bitstream data is obtained based on the at least one channel of audio data and the common component.

The method described in the first aspect of this application may be performed by a sending apparatus, or may be performed by a component (for example, an integrated circuit chip having a signal processing capability, for example, a general-purpose processor) in the sending apparatus.

Compared with the conventional technology in which the sending apparatus processes the at least one channel of audio data to obtain unified formatted bitstream data, according to the foregoing design, the at least one channel of second formatted bitstream data is obtained based on the at least one channel of audio data and the common component, so that a quantity of bytes occupied by the at least one channel of second formatted bitstream data can be reduced, and radio resources used for transmitting the at least one channel of second formatted bitstream data can further be effectively saved.

In a possible design, the sending the first formatted bitstream data and the at least one channel of second formatted bitstream data includes: sending the first formatted bitstream data and the at least one channel of second formatted bitstream data through at least one radio channel.

Compared with the conventional technology in which each of the at least one radio channel transmits unified formatted bitstream data obtained by processing the at least one channel of audio data, according to the foregoing design, the at least one channel of second formatted bitstream data and the first formatted bitstream data are separately transmitted through the at least one radio channel, so that radio resources used for transmitting the at least one channel of second formatted bitstream data can be effectively saved.

In a possible design, the at least one channel of second formatted bitstream data includes N channels of second formatted bitstream data. A quantity of the at least one radio channel is N+1. N is a positive integer.

In a possible design, the first formatted bitstream data is obtained by compressing and/or encoding the common component, and/or the at least one channel of second formatted bitstream data is obtained by compressing and/or encoding at least one channel of audio sub-data that is obtained based on the at least one channel of audio data and the common component.

According to the foregoing design, the sending apparatus may use different compression manners and/or encoding manners to compress and/or encode corresponding audio data based on different requirements of different receiving apparatuses for compression and/or coding, so that different requirements of different receiving apparatuses for compression and/or coding can be met.

In a possible design, the sending the first formatted bitstream data and the at least one channel of second formatted bitstream data includes: sending the first formatted bitstream data and the at least one channel of second formatted bitstream data to a plurality of receiving apparatuses.

According to the foregoing design, when sending formatted bitstream data corresponding to the at least one channel of audio data to the plurality of receiving apparatuses, the sending apparatus does not need to send the unified formatted bitstream data obtained by processing the at least one channel of audio data to each of the plurality of receiving apparatuses, but sends the first formatted bitstream data and one channel of second formatted bitstream data in the at least one channel of second formatted bitstream data to the receiving apparatus. This can effectively save radio resources used for transmitting the at least one channel of second formatted bitstream data.

In a possible design, the common component is obtained by performing transform domain conversion and de-redundancy processing on the at least one channel of audio data.

According to the foregoing design, transform domain conversion and de-redundancy processing are performed on the at least one channel of audio data, to extract a common component corresponding to the at least one channel of audio data. This can reduce a quantity of bytes occupied by the at least one channel of audio data, and can effectively save radio resources used when the sending apparatus transmits the at least one channel of audio data.

In a possible design, the obtaining at least one channel of second formatted bitstream data corresponding to the at least one channel of audio data includes: performing encoding and bitstream formatting separately or performing bitstream formatting on the at least one channel of audio sub-data obtained based on the at least one channel of audio data and the common component, to obtain the at least one channel of second formatted bitstream data. Manners of performing encoding and/or bitstream formatting on at least two channels of audio sub-data in the at least one channel of audio sub-data are different.

According to the foregoing design, the sending apparatus may use different encoding manners or bitstream formatting manners to perform encoding or bitstream formatting on corresponding audio data based on different requirements of different receiving apparatuses for encoded or formatted bitstream data, so that different requirements of different receiving apparatuses for encoded or formatted bitstream data can be met.

In a possible design, a source of the at least one channel of audio data may include but is not limited to: at least one audio receiving apparatus (which may be a microphone or another apparatus having a microphone), or at least one storage medium.

In a possible design, a format of the at least one channel of audio data may include but is not limited to at least one of a CD format, a WAV format, an AIFF format, an MPEG format, an MPEG-4 format, an FLAC format, an MP3 format, an MIDI format, a WMA format, a RealAudio format, an AAC format, and an AMR format.

According to a second aspect, this application further provides an audio data transmission method. The method includes: receiving first formatted bitstream data corresponding to a common component of at least one channel of audio data; receiving at least one channel of second formatted bitstream data corresponding to the at least one channel of audio data; and obtaining a first channel of audio data in the at least one channel of audio data. The at least one channel of second formatted bitstream data is obtained based on the at least one channel of audio data and the common component.

The method described in the second aspect of this application may be performed by a sending apparatus, or may be performed by a component (for example, an integrated circuit chip having a signal processing capability, for example, a general-purpose processor) in the sending apparatus.

Compared with the conventional technology in which the at least one channel of audio data is processed to obtain unified formatted bitstream data, according to the foregoing design, the at least one channel of second formatted bitstream data is obtained based on the at least one channel of audio data and the common component, so that a quantity of bytes occupied by the at least one channel of second formatted bitstream data can be reduced, and radio resources used when the receiving apparatus receives a first channel of second formatted bitstream data in the at least one channel of second formatted bitstream data can be saved. This helps reduce power consumption of the receiving apparatus, has a low requirement for performance of the receiving apparatus, and helps reduce costs of the receiving apparatus.

In a possible design, the receiving first formatted bitstream data corresponding to a common component of at least one channel of audio data and at least one channel of second formatted bitstream data includes: receiving the first formatted bitstream data and the at least one channel of second formatted bitstream data through at least one radio channel.

According to the foregoing design, the receiving apparatus may receive the first formatted bitstream data and one channel of second formatted bitstream data in the at least one channel of second formatted bitstream data that are separately transmitted through the at least one radio channel. Compared with the conventional technology, the receiving apparatus does not need to receive unified formatted bitstream data obtained by processing the at least one channel of audio data, so that radio resources used for transmitting the at least one channel of second formatted bitstream data can be effectively saved, which helps reduce power consumption of the receiving apparatus.

In a possible design, the at least one channel of second formatted bitstream data includes N channels of second formatted bitstream data. A quantity of the at least one radio channel is N+1. N is a positive integer.

In a possible design, the first formatted bitstream data is obtained by compressing and/or encoding the common component; and/or the at least one channel of second formatted bitstream data is obtained by compressing and/or encoding at least one channel of audio sub-data that is obtained based on the at least one channel of audio data and the common component.

According to the foregoing design, the receiving apparatus may be supported in performing a corresponding decompression and/or decoding operation based on a compression manner and/or an encoding manner used for receiving the first formatted bitstream data and the channel of second formatted bitstream data.

In a possible design, the obtaining a first channel of audio data in the at least one channel of audio data includes: performing decoding and bitstream unformatting or performing bitstream unformatting on a first channel of second formatted bitstream data in the at least one channel of second formatted bitstream data and the first formatted bitstream data, to obtain the first channel of audio data.

According to the foregoing design, the receiving apparatus may be supported in performing corresponding decoding and bitstream unformatting operations based on an encoding manner and a bitstream formatting manner used for receiving the first formatted bitstream data and the first channel of second formatted bitstream data, or performing a corresponding bitstream unformatting operation based on a bitstream formatting manner used for receiving the first formatted bitstream data and the first channel of second formatted bitstream data.

In a possible design, a source of the at least one channel of audio data may include but is not limited to: at least one audio receiving apparatus (which may be a microphone or another apparatus having a microphone), or at least one storage medium.

In a possible design, a format of the at least one channel of audio data may include but is not limited to at least one of a CD format, a WAV format, an AIFF format, an MPEG format, an MPEG-4 format, an FLAC format, an MP3 format, an MIDI format, a WMA format, a RealAudio format, an AAC format, and an AMR format.

According to a third aspect, this application further provides a sending apparatus. The sending apparatus has a function of implementing the method according to any one of the first aspect or the possible designs of the first aspect. The function may be implemented by hardware, or may be implemented by hardware executing corresponding software. The hardware or software includes one or more modules corresponding to the function, for example, includes a processing unit and a transceiver unit.

In a possible design, the sending apparatus may alternatively be a chip or an integrated circuit.

In a possible design, the sending apparatus may include a memory and at least one processor. The memory is configured to store a program executed by the at least one processor. When the program is executed by the at least one processor, the sending apparatus may perform the method according to any one of the first aspect or the possible designs of the first aspect.

According to a fourth aspect, this application further provides a sending apparatus. The sending apparatus includes at least one processor and a memory. The memory stores one or more computer programs. When the one or more computer programs stored in the memory are executed by the at least one processor, the sending apparatus is enabled to perform the method according to any one of the first aspect or the possible designs of the first aspect.

According to a fifth aspect, this application provides a sending apparatus. The sending apparatus includes at least one processor. The at least one processor is configured to: be coupled to a memory, and after reading computer program instructions in the memory, perform, based on the computer program instructions, the method according to any one of the first aspect or the possible designs of the first aspect.

According to a sixth aspect, this application further provides a computer-readable storage medium. The computer-readable storage medium is configured to store a computer program. When the computer program is run on a computer, the computer is enabled to perform the method according to any one of the first aspect or the possible designs of the first aspect.

According to a seventh aspect, this application further provides a program product. When the program product runs on a computer, the computer is enabled to perform the method according to any one of the first aspect or the possible designs of the first aspect.

According to an eighth aspect, this application further provides a chip. The chip includes at least one processor and an interface. The interface may be a code/data read and write interface, and the interface is configured to provide computer-executable instructions (the computer-executable instructions are stored in a memory, may be directly read from the memory, or may pass through another component) for the at least one processor. The at least one processor is configured to execute the computer-executable instructions, to implement the method according to any one of the first aspect or the possible designs of the first aspect.

For beneficial effects of the third aspect to the eighth aspect and the possible designs of the third aspect to the eighth aspect, refer to the foregoing descriptions of the beneficial effects of the method according to any one of the first aspect and the possible designs of the first aspect.

According to a ninth aspect, this application further provides a receiving apparatus. The receiving apparatus has a function of implementing the method according to any one of the second aspect or the possible designs of the second aspect. The function may be implemented by hardware, or may be implemented by hardware executing corresponding software. The hardware or the software includes one or more modules corresponding to the function, for example, a transceiver unit and a processing unit.

In a possible design, the receiving apparatus may alternatively be a chip or an integrated circuit.

In a possible design, the receiving apparatus may include a memory and at least one processor. The memory is configured to store a program executed by the at least one processor. When the program is executed by the at least one processor, the receiving apparatus may perform the method according to any one of the second aspect or the possible designs of the second aspect.

According to a tenth aspect, this application further provides a receiving apparatus. The receiving apparatus includes at least one processor and a memory. The memory stores one or more computer programs. When the one or more computer programs stored in the memory are executed by the at least one processor, the receiving apparatus is enabled to perform the method according to any one of the second aspect or the possible designs of the second aspect.

According to an eleventh aspect, this application provides a receiving apparatus. The receiving apparatus includes at least one processor. The at least one processor is configured to: be coupled to a memory, and after reading computer program instructions in the memory, perform, based on the computer program instructions, the method according to any one of the second aspect or the possible designs of the second aspect.

According to a twelfth aspect, this application further provides a computer-readable storage medium The computer-readable storage medium is configured to store a computer program. When the computer program is run on a computer, the computer is enabled to perform the method according to any one of the second aspect or the possible designs of the second aspect.

According to a thirteenth aspect, this application further provides a program product. When the program product runs on a computer, the computer is enabled to perform the method according to any one of the second aspect or the possible designs of the second aspect.

According to a fourteenth aspect, this application further provides a chip. The chip includes at least one processor and an interface. The interface may be a code/data read and write interface, and the interface is configured to provide computer-executable instructions (the computer-executable instructions are stored in a memory, may be directly read from the memory, or may pass through another component) for the at least one processor. The at least one processor is configured to execute the computer-executable instructions, to implement the method according to any one of the second aspect or the possible designs of the second aspect.

For beneficial effects of the ninth aspect to the fourteenth aspect and the possible designs of the third aspect to the eighth aspect, refer to the foregoing descriptions of the beneficial effects of the method according to any one of the second aspect and the possible designs of the second aspect.

According to a fifteenth aspect, this application further provides a communication system. The communication system includes a sending apparatus and a receiving apparatus. The sending apparatus is configured to perform steps performed by the sending apparatus in the first aspect or the solutions provided in embodiments of this application. The receiving apparatus is configured to perform steps performed by the receiving apparatus in the second aspect or the solutions provided in embodiments of this application.

DESCRIPTION OF EMBODIMENTS

To make objectives, technical solution, and advantages of embodiments of this application clearer, the following further describes embodiments of this application in detail with reference to the accompanying drawings.

Figure 1:
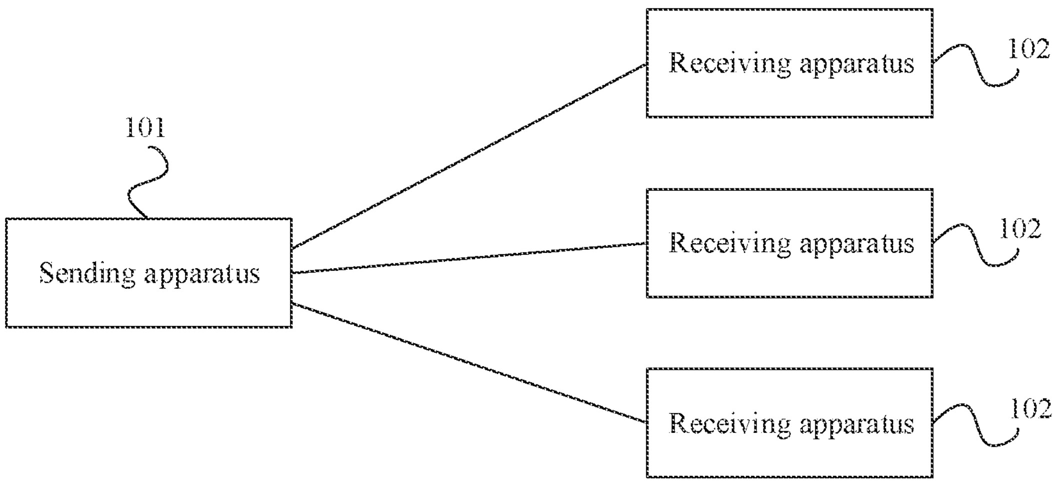
FIG. 1 is a schematic diagram of an architecture of a communication system according to an embodiment of this application.

FIG. 1 is a schematic diagram of an architecture of a communication system according to an embodiment of this application. As shown in FIG. 1, the communication system includes a sending apparatus 101 and a plurality of receiving apparatuses 102 (for example, three receiving apparatuses in FIG. 1).

It should be understood that the communication system provided in embodiments of this application is applicable to both a low-frequency scenario (sub 6G) and a high-frequency scenario (above 6G). An application scenario of the communication system provided in embodiments of this application includes but is not limited to a global system for mobile communications (GSM), a code division multiple access (CDMA) system, a wideband code division multiple access (WCDMA) system, a general packet radio service (CPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, a new radio (NR) communication system, or the like.

It should be understood that, in this embodiment of this application, the sending apparatus 101 may be an apparatus having a wireless transceiver function, and can communicate with one or more receiving apparatuses 102. The sending apparatus 101 may be deployed on land, including an indoor or outdoor device, a handheld device, or a vehicle-mounted device, may be deployed on the water (for example, on a ship), or may be deployed in the air (for example, on an airplane, a balloon, or a satellite). For example, the sending apparatus 101 in this embodiment of this application may be user equipment (UE), a terminal, a mobile station (MS), a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, and the like. The sending apparatus 101 may alternatively be a communication chip that has a communication module and that can perform compression, encoding, and bitstream formatting on audio data.

It should be understood that, in this embodiment of this application, the receiving apparatus 102 may be an apparatus having a wireless transceiver function, and can communicate with one or more sending apparatuses 101. The receiving apparatus 102 may be deployed on land, including an indoor or outdoor device, a handheld device, or a vehicle-mounted device, may be deployed on the water (for example, on a ship), or may be deployed in the air (for example, on an airplane, a balloon, or a satellite). For example, the receiving apparatus 102 in this embodiment of this application may be user equipment (UE), a terminal, a mobile station (MS), a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, and the like. The receiving apparatus 102 may alternatively be a communication chip that has a communication module and that can perform decompression, decoding, and bitstream unformatting on audio data.

It should be understood that the sending apparatus 101 and at least one receiving apparatus 102 may be wirelessly connected to each other.

The sending apparatus 101 is configured to obtain first formatted bitstream data corresponding to a common component of at least one channel of audio data, and obtain at least one channel of second formatted bitstream data corresponding to the at least one channel of audio data. The at least one channel of second formatted bitstream data is obtained based on the at least one channel of audio data and the common component.

The sending apparatus 101 is further configured to send the first formatted bitstream data and the at least one channel of second formatted bitstream data.

The receiving apparatus 102 is configured to receive first formatted bitstream data corresponding to a common component of at least one channel of audio data, and receive at least one channel of second formatted bitstream data corresponding to the at least one channel of audio data.

The receiving apparatus 102 is further configured to obtain a first channel of audio data in the at least one channel of audio data.

In this embodiment of this application, compared with the conventional technology in which the sending apparatus processes the at least one channel of audio data to obtain unified formatted bitstream data, according to the foregoing design, the at least one channel of second formatted bitstream data is obtained by the sending apparatus based on the at least one channel of audio data and the common component, so that a quantity of bytes occupied by the at least one channel of second formatted bitstream data can be reduced, and radio resources used for transmitting the at least one channel of second formatted bitstream data can be saved. In addition, when receiving the first formatted bitstream data and the at least one channel of second formatted bitstream data, the receiving apparatus does not need to perform bitstream unformatting on all second formatted bitstream data in the at least one channel of second formatted bitstream data, but performs bitstream unformatting on the first formatted bitstream data and a channel of second formatted bitstream data that is in the at least one channel of second formatted bitstream data and that is required by the receiving apparatus, to obtain the first channel of audio data that is in the at least one channel of audio data and that is required by the receiving apparatus. This can reduce power consumption of the receiving apparatus, has a low requirement for performance of the receiving apparatus, and helps reduce costs of the receiving apparatus.

Figure 2:
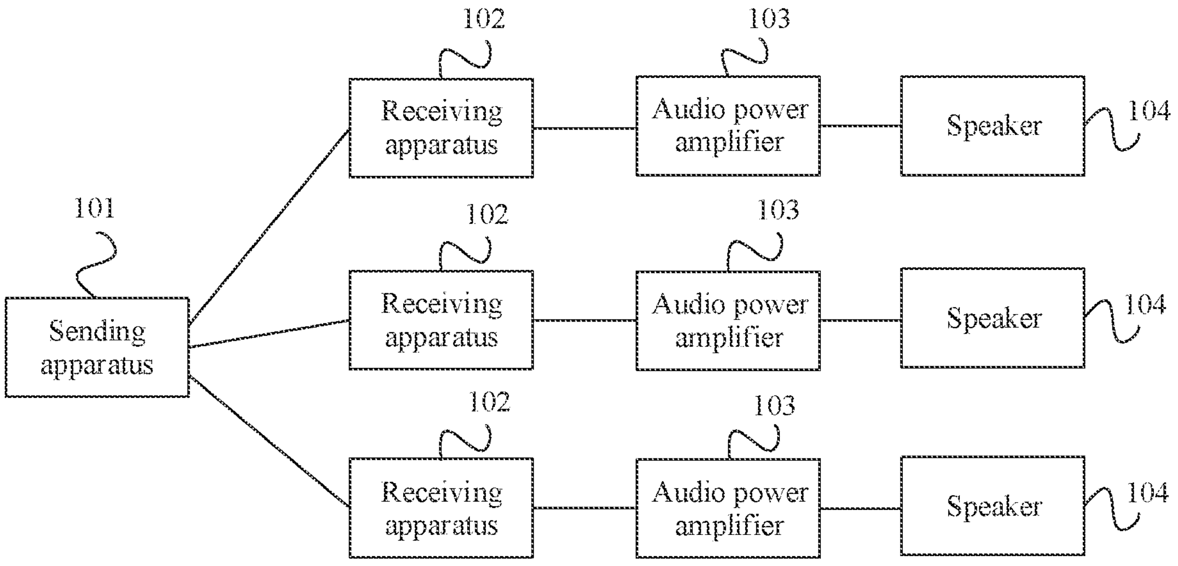
FIG. 2 is a schematic diagram of an architecture of another communication system according to an embodiment of this application.

FIG. 2 is a schematic diagram of an architecture of another communication system according to an embodiment of this application. In addition to the sending apparatus 101 and the receiving apparatus 102 shown in FIG. 1, the communication system may include a plurality of audio power amplifiers 103 (for example, three audio power amplifiers in FIG. 2) and a plurality of speakers 104 (for example, three speakers in FIG. 2). The audio power amplifier 103 is configured to amplify the first channel of audio data that is in the at least one channel of audio data and that is obtained by the receiving apparatus 102. The speaker 104 is configured to play the first channel of amplified audio data.

It should be understood that, in this embodiment of this application, the audio power amplifier 103 may include but is not limited to a vacuum tube power amplifier, a transistor power amplifier, an integrated circuit power amplifier, and the like. The plurality of audio power amplifiers 103 may be audio power amplifiers of a same type, or may be audio power amplifiers of different types. This is not limited in this embodiment of this application.

It should be understood that, in this embodiment of this application, the speaker 104 may include but is not limited to an electric speaker, a cone-type speaker, a horn-type speaker, a dome-shaped speaker, a magnetic speaker, a plasma speaker, an ultrasonic speaker, an electrostatic speaker, a piezoelectric speaker, and the like. The plurality of speakers 104 may be speakers of a same type, or may be speakers of different types. This is not limited in this embodiment of this application.

In this embodiment of this application, the receiving apparatus, the audio power amplifier, and the speaker are disposed in an integrated manner (for example, a tight coupling manner) or an independent manner. When the receiving apparatus, the audio power amplifier, and the speaker are disposed in an independent manner, the audio power amplifier and the speaker may be disposed in an integrated manner (for example, a tight coupling manner), which can resolve a problem that a connection line between the audio power amplifier and the speaker is excessively long, and can reduce costs of connection between the audio power amplifier and the speaker.

With reference to the accompanying drawings, the following describes the technical solutions provided in embodiments of this application.

Before embodiments of this application are described, some terms in this application are first described, to help a person skilled in the art have a better understanding.

(1) A common component in embodiments of this application may be data that has a minimum deviation value from audio information (for example, a sampling value) of at least two channels of audio data and that is obtained based on a predefined or preset rule. The obtained common component may vary with implementation costs corresponding to the rule. However, at the implementation costs corresponding to the rule, the common component may also be data that has a minimum deviation value from the audio information of the at least two channels of audio data. In an example, the common component may be a sum of the audio information of the at least two channels of audio data; a product of a sum of the audio information of the at least two channels of audio data and a corresponding coefficient, where if the coefficient is 0.5, the common component is an average value of the audio information of the at least two channels of audio data; another value of the audio information of the at least two channels of audio data, tor example, a mathematical expectation of the audio information of the at least two channels of audio data; or the like. For example, the at least two channels of audio data include a channel A of audio data and a channel B of audio data. Audio information $A_1$ is from audio information of the channel A of audio data, and audio information $B_1$ is from the channel B of audio data. A common component between the channel A of audio data and the channel B of audio data may be a sum of the audio information and the audio information $B_1$, a product of a sum of the audio information $A_1$ and the audio information $B_1$ and a corresponding coefficient (for example, 0.6), a mathematical expectation of the audio information $A_1$ and the audio information $B_1$, or the like. When the common component is a sum of audio information of at least two channels of audio data, a product of a sum of audio information of at least two channels of audio data and a corresponding coefficient, a mathematical expectation of audio information of at least two channels of audio data, or the like, corresponding rules are different. According to the corresponding rule, the common component may be data that has a minimum deviation value from the audio information of the at least two channels of audio data it should be noted that the common component is not specifically limited in this application, and is subject to common information that can reflect a plurality of channels of audio data.

(2) Coding in embodiments of this application is a process of converting analog audio data into digital audio data, that is, a process of representing a quantized value of the analog audio data by a group of binary digital code. The quantized value of the analog audio data is obtained by performing sampling processing and quantization processing on the analog audio data. Performing sampling processing on the analog audio data is a process of performing discretization processing on the analog audio data in terms of time. Performing quantization processing on the analog audio data is a process of performing discretization processing on each sampling value obtained by performing sampling processing on the analog audio data in magnitude. Coding manners of the audio data may include waveform coding, parameter coding, and hybrid coding. The waveform coding means not directly converting the analog audio data into the digital audio data by using any parameter for generating audio data, so that a waveform shape of reconstructed audio data keeps consistent with a waveform shape of the original audio data as much as possible. Parameter coding means extracting parameters for generating audio from audio waveform data, and using these parameters to reconstruct audio by using an audio generation model, so that the reconstructed audio data maintains a semantic meaning of original audio data as much as possible. Hybrid coding means coding by using two or more coding manners at the same time, for example, coding by using both waveform coding and parameter coding.

(3) Formatted bitstream data in embodiments of this application is data traffic that is of an audio file obtained through processing by using different audio formats and that is transmitted through a communication port in a unit time. The audio format may include but is not limited to: a compact disk (CD) format, a WAV format (windows multimedia audio video format), an audio interchange file format (AIFF), a moving picture experts group (MPEG) format, a moving picture experts group audio layer-4 (MPEG-4) format, a free lossless audio codec (FLAG) format, a moving picture experts group audio layer-3 (MP3) format, a musical instrument digital interface (MIDI) format, a windows media audio (WMA) format, and a real audio (RealAudio) format, an advanced audio coding (AAC) format, and an adaptive multi rate (AMR) format.

(4) Compression in embodiments of this application is a process of reducing a bit rate of audio data by using a corresponding digital signal processing technology on a condition that an amount of useful information in the audio data is not lost or an introduced loss is negligible. The compression may have a corresponding inverse transform, which is referred to as decompression.

(5) A radio channel in this application, which may also be referred to as a radio channel or a radio channel, is a data signal transmission channel using a radio channel signal as a transmission medium, and may be understood as a radio channel through which a radio wave is transmitted by radiating, or may be understood as a radio data transmission channel.

In addition, it should be understood that the term "at least one" in embodiments of this application means one or more, "a plurality of" means two or more, "at least one channel" means one or more channels, and "a plurality of channels" means two or more channels. The term "and/or" describes an association relationship between associated objects and may indicate three relationships. For example, A and/or B may indicate the following cases: Only A exists, both A and B exist, and only B exists. A and B may be singular or plural. The character "/" generally indicates an "or" relationship between the associated objects. Terms "one", "a", "the", "the foregoing". "this", and "the one" of singular forms are also intended to include expressions such as "one or more", unless otherwise specified in the context clearly. In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first formatted bitstream data and second formatted bitstream data are merely for distinguishing different formatted bitstream data, but do not indicate different priorities, importance degrees, or the like of the two channels of formatted bitstream data.

Reference to "an embodiment", "some embodiments", or the like described in embodiments of this application means that one or more embodiments of this application include a specific feature, structure, or characteristic described with reference to embodiments. Therefore, statements such as "in one embodiment", "in some embodiments", "in some other embodiments", and "in still some other embodiments" that appear at different places in this specification do not necessarily refer to a same embodiment, but mean "one or more but not all embodiments", unless otherwise specially emphasized in another manner. The terms "include", "contain", "have", and their variants all mean "include but are not limited to", unless otherwise specifically emphasized in another manner.

Figure 3:
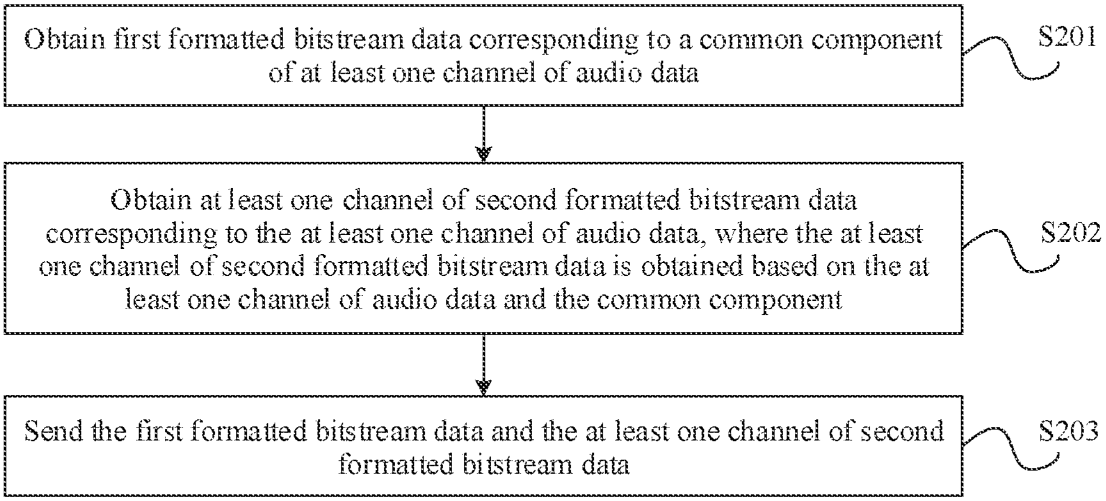
FIG. 3 is a schematic flowchart of an audio data transmission method according to an embodiment of this application.

FIG. 3 is a schematic flowchart of an audio data transmission method according to an embodiment of this application. The method may be applied to the communication system shown in FIG. 1 or FIG. 2 or a similar communication system. As shown in FIG. 3, for example, the method is performed by a sending apparatus. The sending apparatus may be an apparatus such as UE, an MS, a mobile phone, a tablet computer, a computer with a wireless transceiver function, a YR terminal, an AR terminal, or a communication chip that has a communication module and that can perform compression, encoding, and bitstream formatting on audio data. A process of the method includes the following steps.

S201: Obtain first formatted bitstream data corresponding to a common component of at least one channel of audio data.

In some embodiments, the sending apparatus may obtain the at least one channel of audio data in a plurality of manners. For example, the sending apparatus may obtain at least one channel of audio data collected by at least one audio receiving apparatus, and/or obtain at least one channel of audio data stored in at least one storage medium. In other words, the at least one channel of audio data is from the at least one audio receiving apparatus, and/or is from the at least one storage medium. For example, the at least one channel of audio data is from the at least one audio receiving apparatus. Alternatively, the at least one channel of audio data is from the at least one storage medium. Alternatively, a part of audio data in the at least one channel of audio data is from the at least one audio receiving apparatus, and the other part of audio data is from the at least one storage medium. One storage medium may store one or more channels of audio data. The at least one storage medium may be an external storage medium connected to the sending apparatus, or a storage medium disposed inside the sending apparatus. This is not specifically limited in this embodiment of this application. Certainly, the sending apparatus may obtain the at least one channel of audio data by using the at least one audio receiving apparatus and/or the at least one storage medium, and may further obtain the at least one channel of audio data in another manner. For example, the sending apparatus may obtain the at least one channel of audio data transmitted by another apparatus through a radio air interface. Specifically, the audio receiving apparatus may be a microphone, or another apparatus having a microphone. The at least one audio receiving apparatus may be audio receiving apparatuses of a same type, or may be audio receiving apparatuses of different types. This is not limited in this embodiment of this application.

In some embodiments, after obtaining the at least one channel of audio data, the sending apparatus may process the at least one channel of audio data, to obtain the first formatted bitstream data corresponding to the common component of the at least one channel of audio data.

Figure 4:
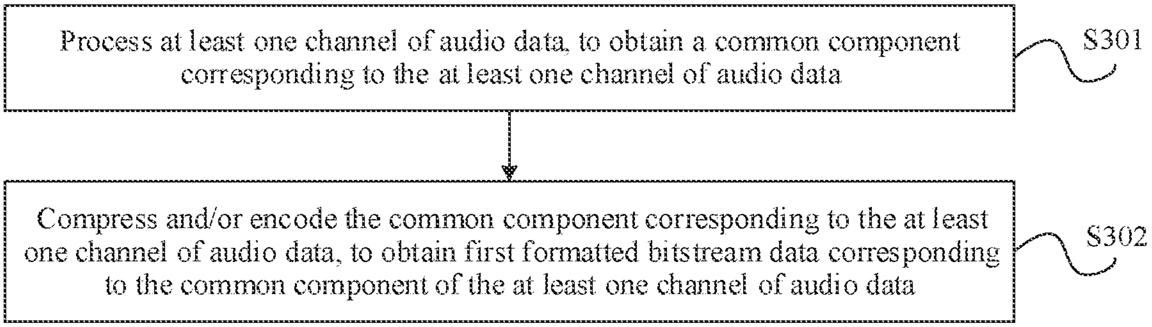
FIG. 4 is a schematic diagram of a process in which a sending apparatus obtains first formatted bitstream data corresponding to a common component of at least one channel of audio data according to an embodiment of this application.

The following specifically describes a process in which the sending apparatus obtains the first formatted bitstream data corresponding to the common component of the at least one channel of audio data. As shown in FIG. 4, the process may include the following steps.

S301: Process the at least one channel of audio data, to obtain a common component corresponding to the at least one channel of audio data.

In some embodiments, the sending apparatus may perform transform domain conversion and de-redundancy processing on the at least one channel of audio data, to obtain the common component corresponding to the at least one channel of audio data. For example, the sending apparatus may perform transform domain conversion on the at least one channel of audio data, to obtain at least one channel of transform domain audio data. Then, the sending apparatus may perform de-redundancy processing on the at least one channel of transform domain audio data, so as to remove redundancy existing alone in each of the at least one channel of audio data. Then, the sending apparatus may add up the at least one channel of transform domain audio data obtained after de-redundancy processing is performed, to obtain the common component corresponding to the at least one channel of audio data, so as to remove redundancy existing between the at least one channel of audio data. Adding up the at least one channel of transform domain audio data obtained after de-redundancy processing may be understood as adding values (for example, sampling values or values obtained after analog/digital conversion) corresponding to the at least one channel of transform domain audio data. In an example, after adding up the at least one channel of transform domain audio data obtained after de-redundancy processing, the sending apparatus may extract an average value of the at least one channel of transform domain audio data obtained after de-redundancy processing, and use the average value as the common component of the at least one channel of audio data; or extract a product of a sum of the at least one channel of transform-domain audio data obtained after de-redundancy processing and a corresponding coefficient, and use the product as the common component of the at least one channel of audio data; or extract a mathematical expectation of the at least one channel of transform-domain audio data obtained after de-redundancy processing as the common component of the at least one channel of audio data.

In this embodiment of this application, a manner in which the sending apparatus performs de-redundancy processing on the at least one channel of transform domain audio data may include but is not limited to: during performing de-redundancy processing on the at least one channel of transform domain audio data, by setting one threshold, forcibly selling data that is lower than the threshold and that is in each of the at least one channel of transform domain audio data to zero; or setting several thresholds, setting the thresholds to several discrete levels, then comparing each of the at least one channel of transform-domain audio data with several different thresholds, so as to determine a discrete level corresponding to each of the at least one channel of transform-domain audio data, and performing de-redundancy processing on each of the at least one channel of transform-domain audio data based on the corresponding discrete level. The threshold is used to control a distortion degree after de-redundancy processing is separately performed on each of the at least one channel of audio data.

In this embodiment of this application, the at least one channel of audio data may be converted by using different transform domains, that is, the transform domains for converting each of the at least one channel of audio data may be the same or different. This is not limited in this embodiment of this application. Transform domain conversion may include but is not limited to: discrete Fourier transform (DFT), discrete cosine transform (DCT), discrete sine transform (DST), and discrete wavelet transform (DWT), discrete Hartley transform (DHT), discrete W transform (DWT), and the like.

In this embodiment of this application, transform domain conversion and de-redundancy processing are performed on the at least one channel of audio data, to obtain the common component corresponding to the at least one channel of audio data. This can reduce a quantity of bytes occupied by each of the at least one channel of audio data, and can further effectively save radio resources used for transmitting the at least one channel of audio data.

S302: Compress and/or encode the common component corresponding to the at least one channel of audio data, to obtain the first formatted bitstream data corresponding to the common component of the at least one channel of audio data.

In some embodiments, after obtaining the common component corresponding to the at least one channel of audio data, the sending apparatus may obtain, in a plurality of manners, a first channel of formatted bitstream data corresponding to the common component of the at least one channel of audio data. For example, the sending apparatus may compress the common component corresponding to the at least one channel of audio data, to obtain the first formatted bitstream data. Alternatively, the sending apparatus may further encode the common component corresponding to the at least one channel of audio data, to obtain the first formatted bitstream data. Alternatively, the sending apparatus may further compress and encode the common component corresponding to the at least one channel of audio data, to obtain the bitstream data in the first format. Specifically, the sending apparatus may perform bitstream formatting on the common component that is compressed and/or encoded and that corresponds to the at least one channel of audio data by using a corresponding audio format, to obtain the first formatted bitstream data corresponding to the common component of the at least one channel of audio data.

Compared with a case in which unified formatted bitstream data (including at least one common component) is obtained after the at least one channel of audio data is transmitted and processed, in this embodiment of this application, the common component corresponding to the at least one channel of audio data is extracted. In this case, the first formatted bitstream data corresponding to the at least one common component does not need to be transmitted, and only the first formatted bitstream data of one common component needs to be transmitted. This can effectively save radio resources used when the sending apparatus transmits the at least one channel of audio data.

S202: Obtain at least one channel of second formatted bitstream data corresponding to the at least one channel of audio data. The at least one channel of second formatted bitstream data is obtained based on the at least one channel of audio data and the common component.

In some embodiments, after obtaining the common component corresponding to the at least one channel of audio data, the sending apparatus may obtain, based on the at least one channel of audio data and the common component, at least one channel of second formatted bitstream data corresponding to the at least one channel of audio data.

Figure 5:
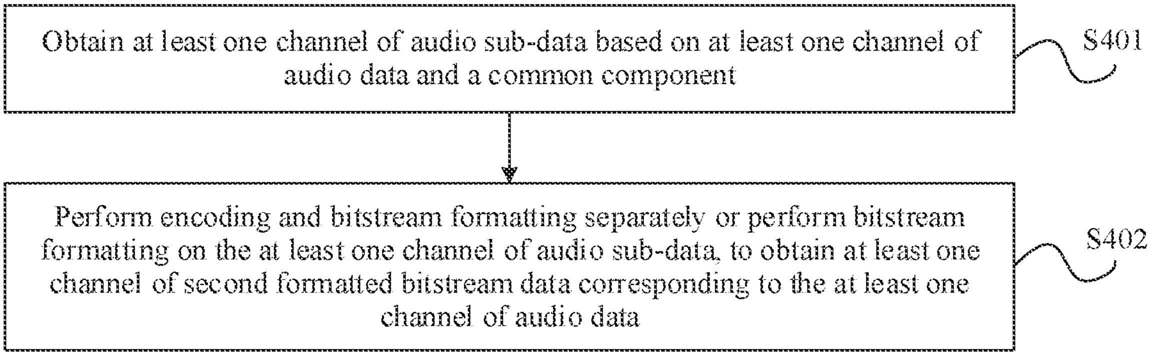
FIG. 5 is a schematic diagram of a process in which a sending apparatus obtains second formatted bitstream data corresponding to at least one channel of audio data according to an embodiment of this application.

The following specifically describes a process in which the sending apparatus obtains the at least one channel of second formatted bitstream data corresponding to the at least one channel of audio data. As shown in FIG. 5, the process may include the following steps.

S401. Obtain at least one channel of audio sub-data based on at least one channel of audio data and the common component.

In some embodiments, after extracting the common component corresponding to the at least one channel of audio data, the sending apparatus may obtain the at least one channel of audio sub-data. To be specific, the at least one channel of audio sub-data is remaining audio data obtained by subtracting the common component from each of the at least one channel of audio data. For example, the at least one channel of audio data includes a channel A of audio data and a channel B of audio data. Audio information $A_1$ is from the channel A of audio data, and audio information $B_1$ is from the channel B of audio data. If a common component of the channel A of audio data and the channel B of audio data is an average value of the audio information $A_1$ and the audio information $B_1$, audio sub-data a corresponding to the channel A of audio data is an absolute value of a value obtained by subtracting the average value from the audio information $A_1$, and audio sub-data b corresponding to the channel B of audio data is an absolute value of a value obtained by subtracting the average value from the audio information $B_1$.

A quantity of the at least one channel of audio data may be the same as or different from a quantity of the at least one channel of audio sub-data. This is not limited in this embodiment of this application. When the quantity of the at least one channel of audio data is the same as the quantity of the at least one channel of audio sub-data, the at least one channel of audio data is in a one-to-one correspondence with the at least one channel of audio sub-data. Alternatively, when the quantity of the at least one channel of audio data is different from the quantity of the at least one channel of audio sub-data, one channel of audio data in the at least one channel of audio data may correspond to two channels of audio sub-data in the at least one channel of audio sub-data, or two channels of audio data in the at least one channel of audio data correspond to one channel of audio sub-data in the at least one channel of audio sub-data. For example, two copies of remaining audio data obtained by extracting the common component from one channel of audio data in the at least one channel of audio data may be made, to obtain two channels of audio sub-data, or remaining audio data obtained by extracting the common component from two channels of audio data in the at least one channel of audio data may be processed, to obtain one channel of audio sub-data.

S402: Perform encoding and bitstream formatting separately or perform bitstream formatting on the at least one channel of audio sub-data, to obtain the at least one channel of second formatted bitstream data corresponding to the at least one channel of audio data.

In some embodiments, after obtaining the at least one channel of audio sub-data, the sending apparatus may perform bitstream formatting on the at least one channel of audio sub-data, to obtain the at least one channel of second formatted bitstream data. The sending apparatus may perform bitstream formatting on the at least one channel of audio sub-data in a plurality of manners. For example, the sending apparatus may separately perform encoding and bitstream formatting on the at least one channel of audio sub-data, or only perform bitstream formatting on the at least one channel of audio sub-data.

Manners in which the sending apparatus performs encoding and/or bitstream formatting on at least two channels of audio sub-data in the at least one channel of audio sub-data are different. For example, the at least one channel of audio sub-data includes audio sub-data a, audio sub-data b, audio sub-data c, and audio sub-data d. The sending apparatus may encode the audio sub-data a in a parameter coding manner, and perform bitstream conversion on the encoded audio sub-data a by using an MP3 format, to obtain second formatted bitstream data corresponding to the audio sub-data a; encode the audio sub-data b in a waveform coding manner, and perform bitstream conversion on the encoded audio sub-data b by using an MP3 format, to obtain second formatted bitstream data corresponding to the audio sub-data b; encode the audio sub-data c in a waveform coding manner, and perform bitstream conversion on the encoded audio sub-data c by using a CD format, to obtain second formatted bitstream data corresponding to the audio sub-data c; and perform bitstream conversion on the audio sub-data d by using a WAVE format, to obtain second formatted bitstream data corresponding to the audio sub-data d.

In the step S402, the sending apparatus may further compress the at least one channel of audio sub-data. For example, the sending apparatus may separately perform compression and encoding and then perform bitstream formatting on the at least one channel of audio sub-data; or perform compression and then perform bitstream formatting on the at least one channel of audio sub-data. In a specific implementation process, the sending apparatus may compress the at least one channel of audio sub-data in different compression manners (for example, by using different compression ratios). To be specific, the compression ratios corresponding to each channel of audio sub-data in the at least one channel of audio sub-data may be the same or different. This is not limited in this embodiment of this application.

Compared with the conventional technology in which the sending apparatus processes the at least one channel of audio data to obtain unified formatted bitstream data, in this embodiment of this application, the at least one channel of second formatted bitstream data is obtained based on the at least one channel of audio data and the common component, so that a quantity of bytes occupied by the at least one channel of second formatted bitstream data can be reduced, and radio resources used for transmitting the at least one channel of second formatted bitstream data can further be effectively saved.

It should be noted that a sequence of performing the step S201 and the step S202 is not specifically limited in this embodiment of this application. For example, the sending apparatus may first perform the step S201 and then perform the step S202, or first perform the step S202 and then perform the step S201, or perform the step S201 and the step S202 simultaneously.

It should be noted that, for example, the first formatted bitstream data and the at least one channel of second formatted bitstream data are obtained by processing by the sending apparatus based on the at least one channel of audio data. In some other embodiments, the first formatted bitstream data and the at least one channel of second formatted bitstream data may also be obtained by processing by another apparatus based on the at least one channel of audio data. To be specific, the sending apparatus may receive the first formatted bitstream data and the at least one channel of second formatted bitstream data that are sent by the another apparatus. A specific manner in which the sending apparatus obtains the first formatted bitstream data and the at least one channel of second formatted bitstream data is not limited in this embodiment of this application.

It should be noted that, in the foregoing embodiment, an example in which the at least one channel of audio data includes at least two channels of audio data is used. In this embodiment of this application, when the at least one channel of audio data includes one channel of audio data, the sending apparatus only needs to obtain one channel of formatted bitstream data. This may be understood as that because a common component does not need to be extracted from one channel of audio data, the sending apparatus only needs to obtain one channel of formatted bitstream data corresponding to the channel of audio data.

S203: Send the first formatted bitstream data and the at least one channel of second formatted bitstream data.

In some embodiments, after obtaining the first formatted bitstream data corresponding to the common component of the at least one channel of audio data and the at least one channel of second formatted bitstream data, the sending apparatus may send the first formatted bitstream data and the at least one channel of second formatted bitstream data to a plurality of receiving apparatuses. In a specific implementation process, the sending apparatus may send the first formatted bitstream data and the at least one channel of second formatted bitstream data through at least one radio channel.

In this embodiment of this application, the sending apparatus may send the first formatted bitstream data and the at least one channel of second formatted bitstream data through the at least one radio channel in a plurality of manners. For example, the sending apparatus may send the first formatted bitstream data and the at least one channel of second formatted bitstream data through the at least one radio channel in a broadcast manner. For example, the sending apparatus may broadcast the first formatted bitstream data and the at least one channel of second formatted bitstream data to the plurality of receiving apparatuses in the broadcast manner. Alternatively, the sending apparatus may send the first formatted bitstream data through the at least one radio channel in the broadcast manner, and send the at least one channel of second formatted bitstream data through the at least one radio channel in a unicast manner.

A logical mapping relationship may exist between the at least one radio channel and the at least one channel of second formatted bitstream data, and the logical mapping relationship may be agreed on by the sending apparatus and the plurality of receiving apparatuses in advance. For example, when the at least one channel of second formatted bitstream data includes N (which is a positive integer) channels of second formatted bitstream data, a quantity of the at least one radio channel is N+1. In this case, the N+1 radio channels may be radio logical channels and/or radio physical channels, for example, the N+1 radio channels may be radio logical channels, or the N+1 radio channels are radio physical channels, or some of the N+1 radio channels are radio logical channels, and others are radio physical channels. One radio physical channel can bear a plurality of radio logical channels. For example, the sending apparatus may send the N channels of second formatted bitstream data to the plurality of receiving apparatuses through N radio channels in the N+1 radio channels in a point-to-point unicast manner, and may send the first formatted bitstream data to the plurality of receiving apparatuses through one radio channel in the N+1 radio channels in the broadcast manner. When the N+1 radio channels are radio logical channels, the N+1 radio channels may be borne on at least one radio physical channel. Alternatively, the sending apparatus may send the at least one channel of second formatted bitstream data and the first formatted bitstream data to the plurality of receiving apparatuses through the N+1 radio channels in the broadcast manner.

In this embodiment of this application, compared with the conventional technology in which the at least one channel of audio data is processed to obtain unified formatted bitstream data, according to the foregoing design, the at least one channel of second formatted bitstream data is obtained based on the at least one channel of audio data and the common component, so that a quantity of bytes occupied by the at least one channel of second formatted bitstream data can be reduced, and radio resources used when the sending apparatus transmits the at least one channel of second formatted bitstream data can be effectively saved.

Figure 6:
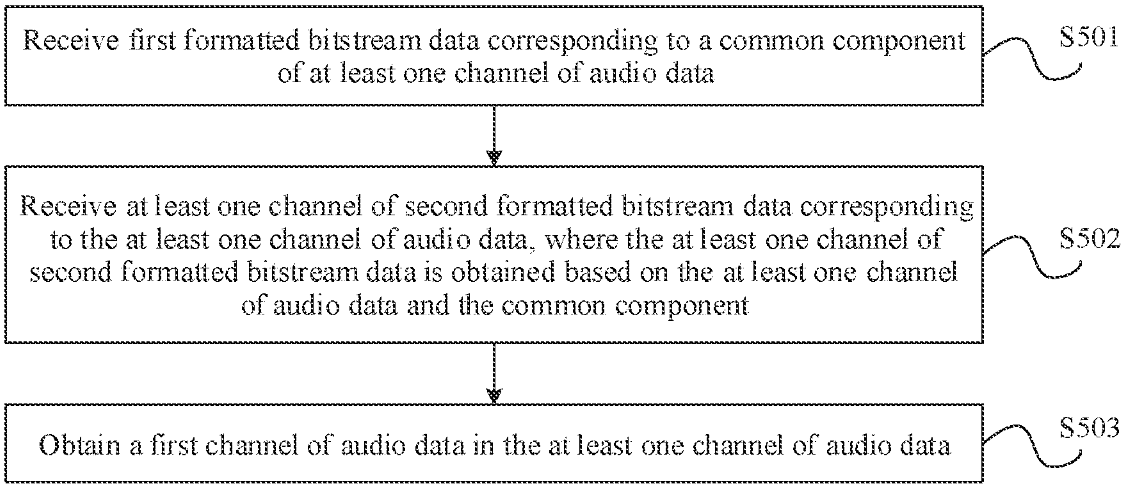
FIG. 6 is a schematic flowchart of an audio data transmission method according to an embodiment of this application.

FIG. 6 is a schematic flowchart of an audio data transmission method according to an embodiment of this application. The method may be applied to the communication system shown in FIG. 1 or FIG. 2 or a similar communication system. As shown in FIG. 6, for example, the method is performed by a single receiving apparatus. The receiving apparatus may be an apparatus such as UE, an MS, a mobile phone, a tablet computer, a computer with a wireless transceiver function, a YR terminal, an AR terminal, or a communication chip that has a communication module and that can perform decompression, decoding, and bitstream unformatting on audio data. A process of the method includes the following steps.

S501: Receive first formatted bitstream data corresponding to a common component of at least one channel of audio data.

In some embodiments, in the step S203, the sending apparatus sends, through the at least one radio channel in the broadcast manner, the first formatted bitstream data corresponding to the common component of the at least one channel of audio data. In this case, the receiving apparatus may receive, through one radio channel in the at least one radio channel, the first formatted bitstream data broadcast by the sending apparatus. If a quantity of the at least one channel of audio data is N (which is a positive integer), a quantity of the at least one radio channel may be N+1.

A radio channel that is in the at least one radio channel and through which the first formatted bitstream data is transmitted may be a radio logical channel or a radio physical channel. If the radio channel is a radio logical channel, the radio channel and a radio channel for transmitting at east one channel of second formatted bitstream data may be borne on a same radio physical channel.

In an example, if a radio channel for transmitting a first channel of formatted bitstream data is a radio physical channel, when the receiving apparatus identifies that formatted bitstream data transmitted through a radio channel a in the at least one radio channel is the first formatted bitstream data, the receiving apparatus may receive the formatted bitstream data transmitted through the radio channel a if a radio channel for transmitting a first channel of formatted bitstream data is a radio logical channel, the radio channel for transmitting the first channel of formatted bitstream data and a radio channel for transmitting the at least one channel of second formatted bitstream data are borne on a same radio physical channel, for example, a radio channel b. If the receiving apparatus identifies that formatted bitstream data that is numbered i and transmitted through the radio channel b is the first formatted bitstream data, the receiving apparatus may receive the formatted bitstream data that is numbered i and transmitted through the radio channel b.

In this embodiment of this application, the at least one channel of audio data is from at least one audio receiving apparatus, or is from at least one storage medium, or is from another apparatus. This is not specifically limited in this embodiment of this application. One storage medium may store one or more channels of audio data. Specifically, the audio receiving apparatus may be a microphone, or another apparatus having a microphone. The at least one audio receiving apparatus may be audio receiving apparatuses of a same type, or may be audio receiving apparatuses of different types. This is not limited in this embodiment of this application.

S502: Receive at least one channel of second formatted bitstream data corresponding to the at least one channel of audio data. The at least one channel of second formatted bitstream data is obtained based on the at least one channel of audio data and the common component.

In some embodiments, in the step S203, the sending apparatus sends, through the at least one radio channel in the broadcast manner, the at least one channel of second formatted bitstream data corresponding to the at least one channel of audio data. In this case, the receiving apparatus may receive, through the at least one radio channel, a first channel of second formatted bitstream data that is required by the receiving apparatus and that is in the at least one channel of second formatted bitstream data. For example, if a quantity of the at least one channel of second formatted bitstream data is N, the quantity of the at least one radio channel is N+1. The receiving apparatus may identify N channels of second formatted bitstream data by using identifiers of the N channels of second formatted bitstream data transmitted through N radio channels in the at least one radio channel. The N radio channels may be radio logical channels and/or radio physical channels.

In an example, if the at least one radio channel is a radio logical channel, the identifier of the at least one channel of second formatted bitstream data may include but is not limited to at least one of the following: a number respectively corresponding to the at least one channel of second formatted bitstream data, a header field of a data packet respectively corresponding to the at least one channel of second formatted bitstream data, and the like. If the at least one radio channel is a radio physical channel, the identifier of the at least one channel of second formatted bitstream data may include but is not limited to at least one of the following: a frequency, a slot, a frequency band, code, and the like respectively corresponding to the radio channel for transmitting the at least one channel of second formatted bitstream data. It may be understood that the at least one radio channel may be distinguished by using technologies such as time division multiplexing, frequency division multiplexing, and code division multiplexing, or may be distinguished by using a frequency respectively corresponding to the at least one radio channel. For example, the at least one radio channel is distinguished by using the frequency. An identifier of the at least one channel of second formatted bitstream data may be a frequency, and the receiving apparatus may correspond to one frequency. In this case, the receiving apparatus may receive one channel of second formatted bitstream data transmitted through a radio channel corresponding to the frequency.

In some other embodiments, in the step S203, the sending apparatus sends, through the at least one radio channel in the unicast manner, the at least one channel of second formatted bitstream data corresponding to the at least one channel of audio data. In this case, the receiving apparatus may receive the first channel of second formatted bitstream data that is in the at least one channel of second formatted bitstream data and that is sent by the sending apparatus through a corresponding radio channel in the at least one radio channel. For example, if the first channel of second formatted bitstream data transmitted through a second radio channel in the at least one radio channel is required by the receiving apparatus, the receiving apparatus may receive, through the second radio channel, the first channel of second formatted bitstream data required by the receiving apparatus. To be specific, a logical mapping relationship exists between at least one radio channel and a plurality of receiving apparatuses. For example, a quantity of the plurality of receiving apparatuses is the same as a quantity of the at least one channel of second formatted bitstream data. For example, when the at least one second formatted bitstream data includes N second formatted bitstream data, that is, when the plurality of receiving apparatuses include N receiving apparatuses, the quantity of the at least one radio channel may be N+1. N is a positive integer. It may be understood that, the receiving apparatus may receive, through the second radio channel in the at least one radio channel corresponding to the receiving apparatus, the first channel of second formatted bitstream data that is in the at least one channel of second formatted bitstream data and that is required by the receiving apparatus.

Compared with the conventional technology in which the at least one channel of audio data is processed to obtain unified formatted bitstream data, in this embodiment of this application, the at least one channel of second formatted bitstream data is obtained based on the at least one channel of audio data and the common component, so that a quantity of bytes occupied by the at least one channel of second formatted bitstream data can be reduced, and radio resources used when the receiving apparatus receives a first channel of second formatted bitstream data in the at least one channel of second formatted bitstream data can be saved. This helps reduce power consumption of the receiving apparatus.

S503: Obtain a first channel of audio data in the at least one channel of audio data.

In some embodiments, after receiving the first channel of second formatted bitstream data and the first formatted bitstream data, the receiving apparatus may perform corresponding processing on the first channel of second formatted bitstream data and the first formatted bitstream data, to obtain the first channel of audio data that is in the at least one channel of audio data and that is required by the receiving apparatus.

Figure 7:
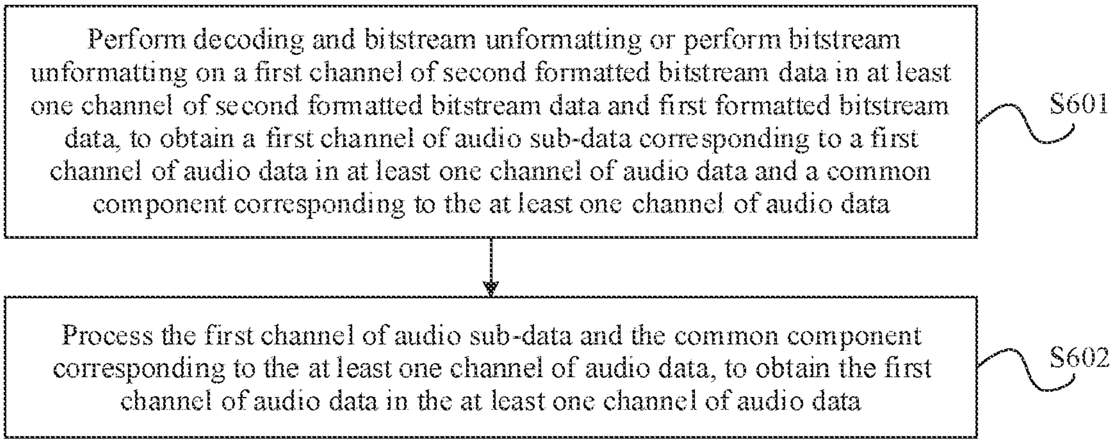
FIG. 7 is a schematic diagram of a process in which a receiving apparatus obtains a first channel of audio data in at least one channel of audio data according to an embodiment of this application.

The following specifically describes a process in which the receiving apparatus obtains the first channel of audio data in the at least one channel of audio data. As shown in FIG. 7 the process may include the following steps.

S601: Perform decoding and bitstream unformatting or perform bitstream unformatting on a first channel of second formatted bitstream data in at least one channel of second formatted bitstream data and the first formatted bitstream data, to obtain a first channel of audio sub-data corresponding to the first channel of audio data in the at least one channel of audio data and a common component corresponding to the at least one channel of audio data.

In this embodiment of this application, encoding manners and/or bitstream formatting manners corresponding to the at least one channel of second formatted bitstream data are different.

In some embodiments, the receiving apparatus may perform bitstream unformatting on the first channel of second formatted bitstream data and the first formatted bitstream data in a plurality of manners. For example, if the first formatted bitstream data is obtained by performing encoding and bitstream formatting on the common component corresponding to the at least one channel of audio data, after receiving the first formatted bitstream data, the receiving apparatus may perform decoding and bitstream unformatting on the first formatted bitstream data, to obtain the common component corresponding to the at least one channel of audio data. Alternatively, if the first formatted bitstream data is obtained by only performing bitstream formatting on the common component corresponding to the at least one channel of audio data, after receiving the first formatted bitstream data, the receiving apparatus may perform bitstream unformatting on the first formatted bitstream data, to obtain the common component corresponding to the at least one channel of audio data. A manner in which the receiving apparatus performs bitstream unformatting on the first channel of second formatted bitstream data is the same as or similar to a manner in which the receiving apparatus performs bitstream unformatting on the first formatted bitstream data. Details are not described herein again. After performing bitstream unformatting on the second formatted bitstream data required by the receiving apparatus, the receiving apparatus may obtain the first channel of audio sub-data.

In this embodiment of this application, the receiving apparatus only needs to perform decoding and bitstream unformatting or perform bitstream unformatting processing on the first channel of second formatted bitstream data and the first formatted bitstream data that are required by the receiving apparatus. In this way, the first channel of audio sub-data corresponding to the first channel of audio data and the common component corresponding to the at least one channel of audio data are obtained, and there is no need to perform decoding and formatted inverse conversion processing or perform bitstream unformatting processing on all second formatted bitstream data in the at least one channel of second formatted bitstream data. This helps reduce power consumption of the receiving apparatus, has a low requirement for performance of the receiving apparatus, and helps reduce costs of the receiving apparatus.

In the step S601, the first channel of second formatted bitstream data received by the receiving apparatus is obtained by compressing the first channel of audio sub-data, and/or the first formatted bitstream data received by the receiving apparatus is obtained by compressing the common component corresponding to the at least one channel of audio data. In this way, before performing bitstream unformatting on the first channel of second formatted bitstream data and the first formatted bitstream data, the receiving apparatus further needs to decompress the first channel of second formatted bitstream data and/or the first formatted bitstream data. Compression manners corresponding to the first channel of second formatted bitstream data and the first formatted bitstream data may be the same or different. This is not limited in this embodiment of this application. The compression manners corresponding to the at least one channel of second formatted bitstream data corresponding to the at least one channel of audio data may be the same or different.

S602: Process the first channel of audio sub-data and the common component corresponding to the at least one channel of audio data, to obtain the first channel of audio data in the at least one channel of audio data.

In some embodiments, after obtaining the common component corresponding to the at least one channel of audio data and the first channel of audio sub-data, the receiving apparatus may process the common component corresponding to the at least one channel of audio data and the first channel of audio sub-data, to obtain the first channel of audio data required by the receiving apparatus. For example, the receiving apparatus may perform transform domain inverse conversion based on the first channel of audio sub-data and the common component corresponding to the at least one channel of audio data, to obtain the first channel of audio data. In this embodiment of this application, transform domain inverse conversion may include but is not limited to: inverse discrete Fourier transform (IDFT), inverse discrete cosine transform (IDCT), inverse discrete sine transform (IDST), inverse discrete wavelet transform (WWI), inverse discrete Hartley transform (IDHT), inverse discrete \V transform (IDWT), and the like.

In this embodiment of this application, the receiving apparatus only needs to perform decoding and bitstream unformatting or perform bitstream unformatting processing on the first channel of second formatted bitstream data and the first formatted bitstream data that are required by the receiving apparatus. In this way, the first channel of audio data that is required by the receiving apparatus and that is in the at least one channel of audio data is obtained, and there is no need to perform decoding and formatting inverse conversion processing or perform bitstream unformatting processing on all second formatted bitstream data in the at least one channel of second formatted bitstream data to obtain the at least one channel of audio data, and then obtain the first channel of audio data required by the receiving apparatus from the at least one channel of audio data. This helps reduce power consumption of the receiving apparatus, has a low requirement for performance of the receiving apparatus, and helps reduce costs of the receiving apparatus.

It should be understood that, in embodiments of this application, the sending apparatus and the receiving apparatus may perform some or all of steps in embodiments of this application. These steps are merely examples. In embodiments of this application, other steps or variations of the steps may be further performed. In addition, the steps may be performed in a sequence different from a sequence presented in embodiments of this application, and not all the steps in embodiments of this application need to be performed.

In embodiments of this application, unless there is a particular description or a logical conflict, terms and/or descriptions in different embodiments are consistent and may be mutually referenced. Technical features in different embodiments may be combined based on their internal logical relationship to form a new embodiment.

The foregoing mainly describes the solutions provided in embodiments of this application from a perspective of interaction between the sending apparatus and the plurality of receiving apparatuses. It should be understood that, to implement the foregoing functions, the sending apparatus and the receiving apparatus include corresponding hardware structures and/or software modules for executing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the sending apparatus or the receiving apparatus may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in embodiments of this application, module division is an example, and is merely logical function division. In an actual implementation, another division manner may be used.

Figure 8:
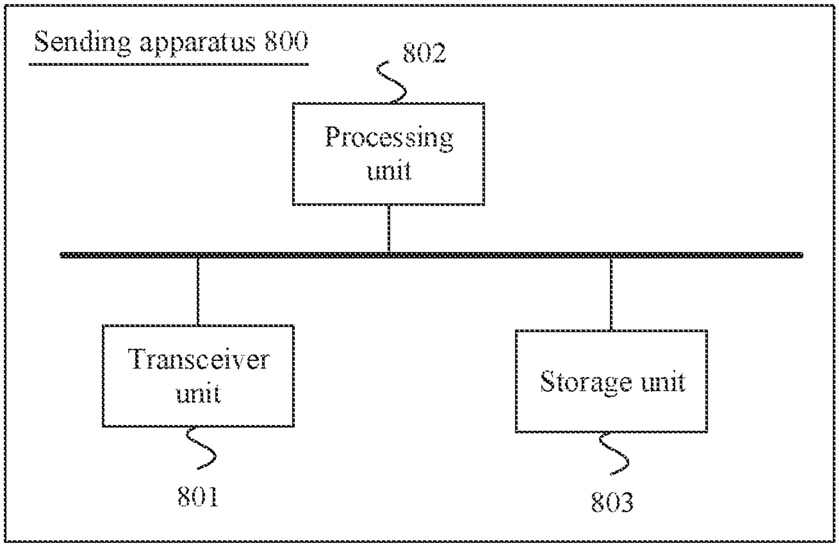
FIG. 8 is a schematic diagram of a structure of a sending apparatus according to an embodiment of this application.

When an integrated unit (module) is used. FIG. 8 is a schematic diagram of a structure of a sending apparatus according to an embodiment of this application. As shown in FIG. 8, a sending apparatus 800 may include a transceiver unit 801 and a processing unit 802.

The transceiver unit 801 is configured to support the sending apparatus 800 in communicating with another apparatus, for example, communicating with at least one audio receiving apparatus or a plurality of receiving apparatuses. The processing unit 802 is configured to control and manage an action of the sending apparatus 800. For example, the processing unit 802 is configured to support the sending apparatus 800 in performing the steps S301 and S302 in FIG. 4 and the steps S401 and S402 in FIG. 5, and/or another process of the technology described in this specification.

Optionally, the sending apparatus 800 may further include a storage unit 803, configured to store program code and/or data of the sending apparatus 800. For details, refer to the following descriptions:

The processing unit 802 is configured to obtain first formatted bitstream data corresponding to a common component of at least one channel of audio data, and obtain at least one channel of second formatted bitstream data corresponding to the at least one channel of audio data. The first formatted bitstream data and the at least one channel of second formatted bitstream data may be received by the processing unit 802 and sent by another apparatus, or may be obtained by processing by the processing unit 802 based on the at least one channel of audio data.

The transceiver unit 801 is configured to send the first formatted bitstream data and the at least one channel of second formatted bitstream data.

The at least one channel of second formatted bitstream data is obtained based on the at least one channel of audio data and the common component.

In a possible design, the transceiver unit 801 may be specifically configured to send the first formatted bitstream data and the at least one channel of second formatted bitstream data through at least one radio channel.

In a possible design, the at least one channel of second formatted bitstream data includes N channels of second formatted bitstream data. A quantity of the at least one radio channel is Ni+1. N is a positive integer.

In a possible design, the first formatted bitstream data is obtained by compressing and/or encoding the common component; and/or the at least one channel of second formatted bitstream data is obtained by compressing and/or encoding at least one channel of audio sub-data that is obtained based on the at least one channel of audio data and the common component.

In a possible design, the transceiver unit 801 may be specifically configured to send the first formatted bitstream data and the at least one channel of second formatted bitstream data to the plurality of receiving apparatuses.

In a possible design, the common component is obtained by performing transform domain conversion and de-redundancy processing on the at least one channel of audio data.

In a possible design, if the first formatted bitstream data and the at least one channel of second formatted bitstream data are obtained by processing by the processing unit 802 based on the at least one channel of audio data, the processing unit 802 may be specifically configured to: perform encoding and bitstream formatting separately or perform bitstream formatting on the at least one channel of audio sub-data obtained based on the at least one channel of audio data and the common component, to obtain the at least one channel of second formatted bitstream data. Manners of performing encoding and/or bitstream formatting on at least two channels of audio sub-data in the at least one channel of audio sub-data are different.

A specific source of the at least one channel of audio data is not limited herein in this application. For example, the at least one channel of audio data may be from at least one audio receiving apparatus (which may be a microphone or another apparatus having a microphone), or may be from at least one storage medium.

A specific format of the at least one channel of audio data is not limited herein in this application. For example, a format of the at least one channel of audio data may include but is not limited to at least one of a CD format, a WW format, an AIFF format, an MPEG format, an MPEG-4 format, an FLAC format, an MP3 format, an MIDI format, a WMA format, a RealAudio format, an AAC format, and an AMR format.

It should be understood that operations and/or functions of the modules in the sending apparatus 800 are separately intended to implement corresponding procedures of the audio data transmission method shown in FIG. 3 to FIG. 5. For brevity, details are not described herein again.

Figure 9:
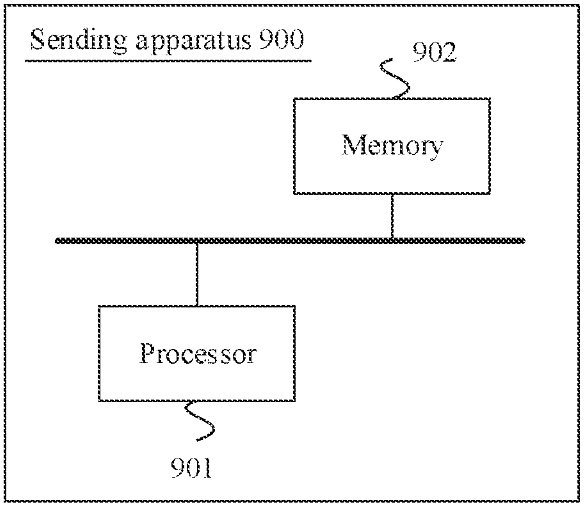
FIG. 9 is a schematic diagram of a structure of a sending apparatus according to an embodiment of this application.

When an integrated unit (module) is used, FIG. 9 is a schematic diagram of a structure of a sending apparatus according to an embodiment of this application. As shown in FIG. 9, a sending apparatus 900 may include at least one processor 901 and a memory 902. The memory 902 stores one or more computer programs, for example, one or more computer programs necessary for the sending apparatus 900. The at least one processor 901 is configured to support the sending apparatus 900 in implementing the foregoing audio data transmission method. For example, when the one or more computer programs stored in the memory 902 are executed by the at least one processor 901, the sending apparatus 900 is enabled to implement any one of the possible implementations of the embodiment of the audio data transmission method shown in FIG. 3 to FIG. 5, and/or is configured to implement other embodiments described in this specification.

Figure 10:
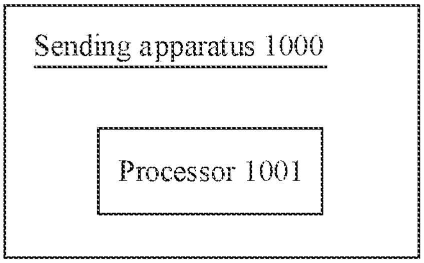
FIG. 10 is a schematic diagram of a structure of a sending apparatus according to an embodiment of this application.

When an integrated unit (module) is used, FIG. 10 is a schematic diagram of a structure of a sending apparatus according to an embodiment of this application. As shown in FIG. 10, a sending apparatus 1000 includes at least one processor 1001. The at least one processor 1001 is configured to: couple to a memory (the memory may be an internal or external memory of the sending apparatus 1000), and after reading computer program instructions in the memory, execute the computer program instructions to implement any one of the possible implementations of the embodiment of the audio data transmission method shown in FIG. 3 to FIG. 5; and/or is configured to implement other embodiments described in this specification.

Based on a same concept as the foregoing method embodiments, an embodiment of this application further provides a sending apparatus. The sending apparatus includes a module/unit for performing any one of the method embodiments of the foregoing audio data transmission method or the possible implementations of the method embodiments. These modules/units may be implemented by hardware, or may be implemented by hardware by executing corresponding software.

Figure 11:
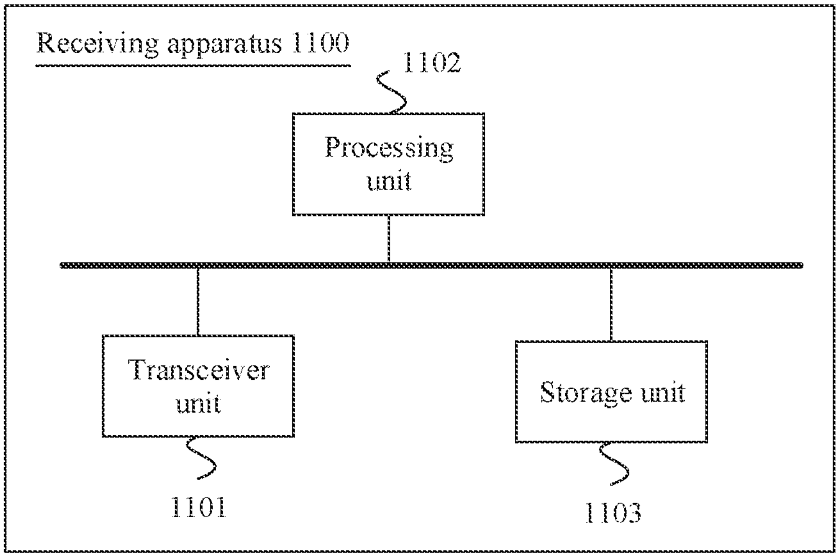
FIG. 11 is a schematic diagram of a structure of a receiving apparatus according to an embodiment of this application.

When an integrated unit (module) is used, FIG. 11 is a schematic diagram of a structure of a receiving apparatus according to an embodiment of this application. As shown in FIG. 11, a receiving apparatus 1100 may include a transceiver unit 1101 and a processing unit 1102.

The transceiver unit 1101 is configured to support the receiving apparatus 1100 in communicating with another apparatus, for example, communicating with a sending apparatus. The processing unit 1102 is configured to control and manage an action of the receiving apparatus 1100. For example, the processing unit 1102 is configured to support the receiving apparatus 1100 in performing the steps S601 and S602 in FIG. 7, and/or is configured to perform another process of the technology described in this specification.

Optionally, the receiving apparatus 1100 may further include a storage unit 1103, configured to store program code and/or data of the receiving apparatus 1100. For details, refer to the following descriptions:

The transceiver unit 1101 is configured to receive first formatted bitstream data corresponding to a common component of at least one channel of audio data, and receive at least one channel of second formatted bitstream data corresponding to the at least one channel of audio data.

The processing unit 1102 is configured to obtain a first channel of audio data in the at least one channel of audio data.

The at least one channel of second formatted bitstream data is obtained based on the at least one channel of audio data and the common component.

In a possible design, the transceiver unit 1101 may be specifically configured to receive the first formatted bitstream data and the at least one channel of second formatted bitstream data through at least one radio channel.

In a possible design, the at least one channel of second formatted bitstream data includes N channels of second formatted bitstream data. A quantity of the at least one radio channel is N+1. N is a positive integer.

In a possible design, the first formatted bitstream data is obtained by compressing and/or encoding the common component; and/or the at least one channel of second formatted bitstream data is obtained by compressing and/or encoding at least one channel of audio sub-data that is obtained based on the at least one channel of audio data and the common component.

In a possible design, the processing unit 1102 may be specifically configured to: perform decoding and bitstream unformatting or perform bitstream unformatting on a first channel of second formatted bitstream data in the at least one channel of second formatted bitstream data and the first formatted bitstream data, to obtain the first channel of audio data.

A specific source of the at least one channel of audio data is not limited herein in this application. For example, the at least one channel of audio data may be from at least one audio receiving apparatus (which may be a microphone or another apparatus having a microphone), or may be from at least one storage medium.

A specific format of the at least one channel of audio data is not limited herein in this application. For example, a format of the at least one channel of audio data may include but is not limited to at least one of a CD format, a WAV format, an AIFF format, MPEG format, an MPEG-4 format, an FLAC format, an MP3 format, an MIDI format, a WMA format, a RealAudio format, an AAC format, and an AMR format.

It should be understood that operations and/or functions of the modules in the receiving apparatus 1100 are separately intended to implement corresponding procedures of the audio data transmission method shown in FIG. 6 and FIG. 7. For brevity, details are not described herein again.

Figure 12:
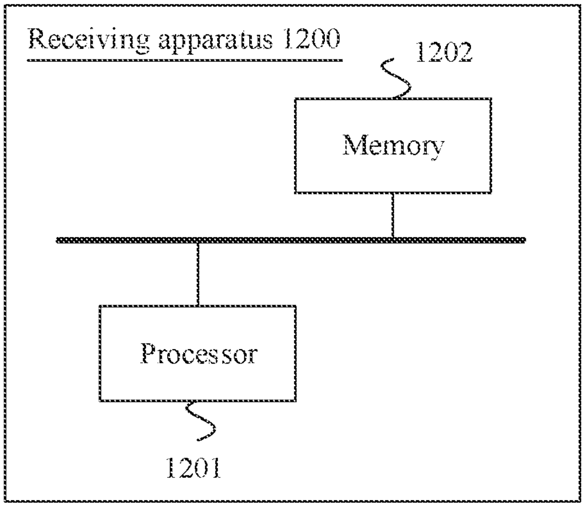
FIG. 12 is a schematic diagram of a structure of a receiving apparatus according to an embodiment of this application.

When an integrated unit (module) is used, FIG. 12 is a schematic diagram of a structure of a receiving apparatus according to an embodiment of this application. As shown in FIG. 12, a receiving apparatus 1200 may include at least one processor 1201 and a memory 1202. The memory 1202 stores one or more computer programs, for example, is configured to store one or more computer programs necessary for the receiving apparatus 1200. The at least one processor 1201 is configured to support the receiving apparatus 1200 in implementing the foregoing audio data transmission method. For example, when the one or more computer programs stored in the memory 1202 are executed by the at least one processor 1201, the receiving apparatus 1200 is enabled to implement any one of the possible implementations of the embodiment of the audio data transmission method shown in FIG. 6 and FIG. 7, and/or is configured to implement other embodiments described in this specification.

Figure 13:
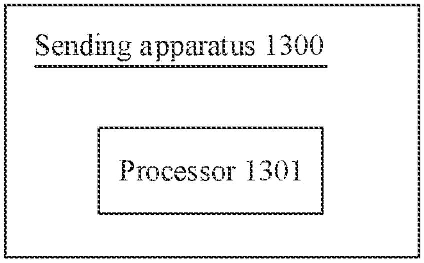
FIG. 13 is a schematic diagram of a structure of a receiving apparatus according to an embodiment of this application.

When an integrated unit (module) is used, FIG. 13 is a schematic diagram of a structure of a receiving apparatus according to an embodiment of this application. As shown in FIG. 13, a receiving apparatus 1300 includes at least one processor 1301. The at least one processor 1301 is configured to: couple to a memory (the memory may be an internal or external memory of the receiving apparatus 1300), and after reading computer program instructions in the memory, execute the computer program instructions to implement any one of the possible implementations of the embodiment of the audio data transmission method shown in FIG. 6 and FIG. 7; and/or is configured to implement other embodiments described in this specification.

Based on a same concept as the foregoing method embodiments, an embodiment of this application further provides a receiving apparatus. The receiving apparatus includes a module/unit for performing any one of the method embodiments of the foregoing audio data transmission method or the possible implementations of the method embodiments. These modules/units may be implemented by hardware, or may be implemented by hardware by executing corresponding software.

Based on a same concept as the foregoing method embodiments, an embodiment of this application further provides a computer-readable storage medium. The computer-readable storage medium stores a computer program. When the computer program is run on a computer, the computer is enabled to perform any one of the method embodiments of the foregoing audio data transmission method or the possible implementations of the method embodiments, for example, perform any step of the embodiments of the audio data transmission method shown in FIG. 3 to FIG. 7, and/or perform another process of the technology described in this specification.

Based on a same concept as the foregoing method embodiments, an embodiment of this application further provides a program product. When the program product runs on a computer, the computer is enabled to perform any one of the method embodiments of the foregoing audio data transmission method or the possible implementations of the method embodiments, for example, perform any step of the embodiments of the audio data transmission method shown in FIG. 3 to FIG. 7, and/or perform another process of the technology described in this specification.

Based on a same concept as the foregoing method embodiments, an embodiment of this application further provides a chip. The chip includes at least one processor and an interface. The interface may be a code/data read and write interface, and the interface is configured to provide computer-executable instructions (the computer-executable instructions are stored in a memory, may be directly read from the memory, or may pass through another component) for the at least one processor. The at least one processor is configured to execute the computer-executable instructions, to implement any one of the method embodiments of the foregoing audio data transmission method or the possible implementations of the method embodiments, for example, perform any step of the embodiments of the audio data transmission method shown in FIG. 3 to FIG. 7, and/or perform another process of the technology described in this specification.

An embodiment of this application further provides a smart cockpit product, and the smart cockpit product includes the foregoing sending apparatus and/or the foregoing receiving apparatus.

An embodiment of this application further provides an intelligent device or a transportation vehicle. The intelligent device includes the foregoing sending apparatus and/or the foregoing receiving apparatus, and the transportation vehicle includes the foregoing sending apparatus and/or the foregoing receiving apparatus. Specifically, the intelligent device may be a robot or the like, and the transportation vehicle may be an intelligent vehicle, a connected vehicle, an unscrewed aerial vehicle, an unmanned transportation vehicle, or the like.

It should be understood that the processor or the processing unit (the processor or the processing unit shown in FIG. 8 to FIG. 11) in embodiments of this application may be an integrated circuit chip and has a signal processing capability. In an implementation process, steps in the method embodiments of the foregoing audio data transmission can be implemented by using a hardware integrated logical circuit in the processor, or by using instructions in a form of software. The processor may be a general-purpose central processing unit (CPU), a general-purpose processor, digital signal processor (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It should be understood that the memory or storage unit in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. It is illustrated by way of example, and not limitation, that many forms of RAM are available, such as a static random access memory (Static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), synchlink dynamic random access memory (synchlink DRAM, SLDRAM), and a direct rambus random access memory (direct rambus RAM, DR RAM). It should be noted that the memory of the systems and methods described in this application includes but is not limited to these and any memory of another proper type.

Various illustrative logic units and circuits described in embodiments of this application may implement or operate the described functions by using a general-purpose processor, a digital signal processor, an application-specific integrated circuit (ASIC), a field programmable gate array (FPGA), or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable disk, a CD-ROM, or any other storage medium in the art. For example, the storage medium may be connected to the processor, so that the processor can read information from the storage medium and write information to the storage medium. Optionally, the storage medium may be integrated into the processor. The processor and the storage medium may be disposed in an ASIC. The ASIC may be disposed in a communication device (for example, a sending apparatus or a receiving apparatus), for example, may be disposed in different components of the communication device.

All or some of the foregoing embodiments may be implemented by using software, hardware, firmware, or any combination thereof. When software is used to implement embodiments, all or some of embodiments may be implemented in a form of a computer program product. The computer program product includes one or more computer programs or instructions. When the computer programs or instructions are loaded and executed on a computer, the procedure or functions according to embodiments of this application are completely or partially generated. The computer may be a general-purpose computer, a dedicated computer, a computer network, or other programmable apparatuses. The computer programs or the instructions may be stored in a computer-readable storage medium, or may be transmitted by using a computer-readable storage medium The computer-readable storage medium may be any usable medium accessible by a computer, or a data storage device, such as a server, integrating one or more usable media. The usable medium may be a magnetic medium, for example, a floppy disk, a hard disk drive, or a magnetic tape; or may be an optical medium, for example, a DVD; or may be a semiconductor medium, for example, a solid state drive (SSD).

Embodiments of this application are described with reference to the flowcharts and/or block diagrams of the method, the apparatus, and the computer program product according to embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although embodiments of this application are described with reference to specific features, it is clear that various modifications and combinations may be made to them without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application.

What is claimed is:

1. An audio data transmission method, wherein the method comprises:

obtaining first formatted bitstream data corresponding to a common component of at least one channel of audio data;

obtaining at least one channel of second formatted bitstream data corresponding to the at least one channel of audio data, wherein the at least one channel of second formatted bitstream data is obtained based on the at least one channel of audio data and the common component, and the at least one channel of second formatted bitstream data is obtained by at least one of compressing or encoding at least one channel of audio sub-data that is obtained based on the at least one channel of audio data and the common component; and sending the first formatted bitstream data and the at least one channel of second formatted bitstream data to a plurality of receiving apparatuses, wherein two receiving apparatuses of the plurality of receiving apparatuses have different requirements for at least one of compression or encoding.

2. The method according to claim 1, wherein sending the first formatted bitstream data and the at least one channel of second formatted bitstream data comprises:

sending the first formatted bitstream data and the at least one channel of second formatted bitstream data through at least one radio channel.

3. The method according to claim 2, wherein the at least one channel of second formatted bitstream data comprises N channels of second formatted bitstream data, a quantity of the at least one radio channel is N+1, and N is a positive integer.

4. The method according to claim 1, wherein:

the first formatted bitstream data is obtained by at least one of compressing or encoding the common component.

5. The method according to claim 1, wherein the common component is obtained by performing transform domain conversion and de-redundancy processing on the at least one channel of audio data.

6. The method according to claim 5, wherein obtaining the at least one channel of second formatted bitstream data corresponding to the at least one channel of audio data comprises:

performing encoding and bitstream formatting separately or performing bitstream formatting on the at least one channel of audio sub-data, obtained based on the at least one channel of audio data and the common component, to obtain the at least one channel of second formatted bitstream data, wherein manners of performing at least one of encoding or bitstream formatting on at least two channels of audio sub-data are different.

7. The method according to claim 1, wherein the at least one channel of audio data is from at least one audio receiving apparatus, or is from at least one storage medium.

8. An audio data transmission method, comprising:
receiving, by a first receiving apparatus, first formatted bitstream data corresponding to a common component of at least one channel of audio data;
receiving, by the first receiving apparatus, at least one channel of second formatted bitstream data corresponding to the at least one channel of audio data, wherein the at least one channel of second formatted bitstream data is obtained based on the at least one channel of audio data and the common component, the at least one channel of second formatted bitstream data is obtained by at least one of compressing or encoding at least one channel of audio sub-data that is obtained based on the at least one channel of audio data and the common component, the first formatted bitstream data and the at least one channel of second formatted bitstream data are sent to a plurality of receiving apparatuses including the first receiving apparatus, and two receiving apparatuses of the plurality of receiving apparatuses have different requirements for at least one of compression or encoding; and
obtaining, by the first receiving apparatus, a first channel of audio data in the at least one channel of audio data.

9. The method according to claim 8, wherein receiving the first formatted bitstream data corresponding to the common component of the at least one channel of audio data and the at least one channel of second formatted bitstream data comprises:
receiving the first formatted bitstream data and the at least one channel of second formatted bitstream data through at least one radio channel.

10. The method according to claim 9, wherein the at least one channel of second formatted bitstream data comprises N channels of second formatted bitstream data, a quantity of the at least one radio channel is N+1, and N is a positive integer.

11. The method according to claim 8, wherein:
the first formatted bitstream data is obtained by at least one of compressing or encoding the common component.

12. The method according to claim 11, wherein obtaining the first channel of audio data in the at least one channel of audio data comprises:
performing decoding and bitstream unformatting or performing bitstream unformatting on a first channel of second formatted bitstream data in the at least one channel of second formatted bitstream data and the first formatted bitstream data to obtain the first channel of audio data.

13. The method according to claim 8, wherein the at least one channel of audio data is from at least one audio receiving apparatus, or is from at least one storage medium.

14. An apparatus, comprising:
one or more processors; and
a non-transitory storage medium in communication with the one or more processors, wherein the non-transitory storage medium stores program instructions that, when executed by the one or more processors, cause the apparatus to:
obtain first formatted bitstream data corresponding to a common component of at least one channel of audio data and at least one channel of second formatted bitstream data corresponding to the at least one channel of audio data, wherein the at least one channel of second formatted bitstream data is obtained based on the at least one channel of audio data and the common component, and the at least one channel of second formatted bitstream data is obtained by at least one of compressing or encoding at least one channel of audio sub-data that is obtained based on the at least one channel of audio data and the common component; and
send the first formatted bitstream data and the at least one channel of second formatted bitstream data to a plurality of receiving apparatuses, wherein two receiving apparatuses of the plurality of receiving apparatuses have different requirements for at least one of compression or encoding.

15. The apparatus according to claim 14, wherein the program instructions further cause the apparatus to:
send the first formatted bitstream data and the at least one channel of second formatted bitstream data through at least one radio channel.

16. The apparatus according to claim 15, wherein the at least one channel of second formatted bitstream data comprises N channels of second formatted bitstream data, and a quantity of the at least one radio channel is N+1.

17. The apparatus according to claim 14, wherein:
the first formatted bitstream data is obtained by at least one of compressing or encoding the common component.

18. The apparatus according to claim 14, wherein the common component is obtained by performing transform domain conversion and de-redundancy processing on the at least one channel of audio data.

19. The apparatus according to claim 14, wherein the at least one channel of audio data is from at least one audio receiving apparatus, or is from at least one storage medium.

20. The apparatus according to claim 15, wherein obtaining the at least one channel of second formatted bitstream data corresponding to the at least one channel of audio data comprises:
performing encoding and bitstream formatting separately or performing bitstream formatting on the at least one channel of audio sub-data, obtained based on the at least one channel of audio data and the common component, to obtain the at least one channel of second formatted bitstream data, wherein manners of performing at least one of encoding or bitstream formatting on at least two channels of audio sub-data are different.

* * * * *